US005689622A

United States Patent [19]

Higashino et al.

[11] Patent Number: 5,689,622
[45] Date of Patent: Nov. 18, 1997

[54] METHOD FOR ADJUSTING NETWORK PARAMETERS IN A MULTI-LAYER PERCEPTRON DEVICE PROVIDED WITH MEANS FOR EXECUTING THE METHOD

[75] Inventors: Junichi Higashino, Tokyo, Japan; Eric H. J. Persoon, Eindhoven, Netherlands

[73] Assignees: N.V. Philips Gloeilampenfabrieken, Eindhoven, Netherlands; Hitachi Ltd., Tokyo, Japan

[21] Appl. No.: 391,324

[22] Filed: Feb. 21, 1995

Related U.S. Application Data

[63] Continuation of Ser. No. 141,439, Oct. 18, 1993, abandoned, which is a continuation of Ser. No. 570,472, Aug. 21, 1990, abandoned.

[30] Foreign Application Priority Data

Aug. 23, 1989 [EP] European Pat. Off. ............ 89202133

[51] Int. Cl.⁶ .................................................. G06F 15/18
[52] U.S. Cl. ...................................... 395/23; 395/24
[58] Field of Search .................................. 395/23, 24

[56] References Cited

U.S. PATENT DOCUMENTS

| | | | |
|---|---|---|---|
| 4,874,963 | 10/1989 | Alspector | 395/24 |
| 5,003,490 | 3/1991 | Castelaz et al. | 395/22 |
| 5,033,006 | 7/1991 | Ishizuka et al. | 395/23 |
| 5,046,020 | 9/1991 | Filkin | 395/23 |
| 5,056,037 | 10/1991 | Eberhardt | 395/24 |
| 5,107,454 | 4/1992 | Niki | 395/24 |
| 5,109,351 | 4/1992 | Simar, Jr. | 395/24 |
| 5,129,039 | 7/1992 | Hiraiwa | 395/24 |
| 5,195,169 | 3/1993 | Kamiya et al. | 395/23 |

FOREIGN PATENT DOCUMENTS 8807234  9/1988  WIPO .................. G06F 1/00

OTHER PUBLICATIONS

"On the use of Backpropagation in Associative Reinforcement Learning", Williams et al, IEEE, Int. Conf. on Neural Networks Jul. 24–27, 1988.
"Experiments on Neural Net Recognition of Spoken and Written Text", Burr et al., IEEE Trans. on Acoustics, Speech and Signal Processing, 1988.
"Accelerating the Convergence of the Back–Propagation Method", Vogl et al, Biol. Cybern, 1988.
"Learning Algorithm for Perceptrons using Back–Propagation with Selective Updates", Huang et al, 1990 IEEE.
"A Simple Procedure for Pruning Back–Propagation Trained Neural Networks", Karnin et al, 1990 IEEE, Tran–on–n–n, Jun. 1990.
"Neural Networks, Part 2", Wasserman et al, 1988 IEEE.
"Increased Rates of Convergence Through Learning Rate Adaptation" Jacobs Neural Networks, vol. 1, No. 4, 1988.
Castelaz et al,"Neural Networks in Defense Applications", IEEE Inter. Conf. on Neural Networks, 1988.

*Primary Examiner*—George B. Davis

[57] ABSTRACT

A perceptron device has processing elements arranged in an input layer, one or more hidden layers, and an output layer. The training method of the perceptron device uses the back propagation method. In order to increase learning speed, the learning rate for the updates of a particular processing element is a function f(M,N,K) of the number N of inputs to that element, the number K of outputs of that element, and the number N of inputs to the next layer. Function f increases with increasing M, and decreases with increasing K and N.

10 Claims, 2 Drawing Sheets

$$E = \frac{1}{2}\sum_{p=1}^{n_p}\sum_{k=1}^{n_k}(y_{pk} - t_{pk})^2$$

$$= \frac{1}{2}\sum_{p=1}^{n_p}\sum_{k=1}^{n_k}(f(net_{pk}) - t_{pk})^2$$

$$= \frac{1}{2}\sum_{p=1}^{n_p}\sum_{k=1}^{n_k}(f(\sum_{j=1}^{n_j}w_{kj}f(net_{pj})) - t_{pk})^2$$

FIG. 3a $$\partial E/\partial w_{kj} = \sum_{k=1}^{n_k}(y_k - t_k)\frac{df(net_k)}{dnet_k}$$

$$= \sum_{k=1}^{n_k}(y_k - t_k)f'(net_k)\frac{\partial net_k}{\partial w_{kj}}$$

$$= \sum_{k=1}^{n_k}(y_k - t_k)f'(net_k)\frac{\partial \sum_{j=1}^{n_j}w_{kj}y_j}{\partial w_{kj}}$$

$$= (y_k - t_k)f'(net_k)y_j$$

$$= \delta_k y_j \; ;$$

$$\delta_k = (y_k - t_k)f'(net_k)$$

FIG. 3b $$\partial E/\partial w_{ji} = \sum_{k=1}^{n_k}(y_k - t_k)f'(net_k)\frac{\partial \sum_{j=1}^{j=n_j}w_{kj}f(net_j)}{\partial w_{ji}}$$

$$= \sum_{k=1}^{n_k}(y_k - t_k)f'(net_k)w_{kj}\frac{\partial \sum_{j=1}^{j=n_j}f(net_j)}{\partial w_{ji}}$$

$$= \sum_{k=1}^{n_k}(y_k - t_k)f'(net_k)w_{kj}f'(net_j)y_i$$

$$= \sum_{k=1}^{n_k}\delta_k w_{kj}f'(net_j)y_i$$

$$= \delta_j y_i \; ;$$

$$\delta_j = \sum_{k=1}^{n_k}\delta_k w_{kj}f'(net_j)$$

FIG. 3c

METHOD FOR ADJUSTING NETWORK PARAMETERS IN A MULTI-LAYER PERCEPTRON DEVICE PROVIDED WITH MEANS FOR EXECUTING THE METHOD

This is a continuation of application Ser. No. 08/141,439, filed Oct. 18, 1993, now abandoned which is a continuation of Ser. No. 07/570,472, filed Aug. 21, 1990, now abandoned.

FIELD OF THE INVENTION

The invention generally relates to adjusting network parameters of a perceptron device. A perceptron device consists of a sequence of an input layer, at least one hidden layer and an output layer. Each layer (except the input layer) comprises a plurality of processing elements that are each fed by one or more elements of the preceding layer, in the limiting case by all elements of the preceding layer. Each interconnection between two elements in contiguous layers is provided with a network parameter which is a factor for multiplication by the quantity, usually an analog quantity, that is transported along the interconnection in question. Such factor may be positive, negative, or zero and, in principle, may have an arbitrary value. For initiation, the network is trained by presenting a set of input vectors to the set of elements of the input layer. Each input vector produces a result vector at the outputs of the output layer, which result vector is compared to an associated intended target vector. The difference between result vector and target vector may be calculated, for example, as a sum of squared differences, each difference relating to a particular vector component of the result vector. The network is adjusted by changing the network parameters after presentation of one or more input vectors. The use of a perceptron device is for recognition of various multi-quantity patterns, such as pixel patterns (e.g. representing characters), acoustic patterns, fingerprints and others. The mapping of various operations on respective hardware elements is considered a degree of freedom which is open to choice.

BACKGROUND ART

The perceptron art has been extensively described in various publications which are summarized in U.S. patent application Ser. No. 24,998 to Tomillinson, filed Mar. 12, 1987, corresponding PCT Application WO 88/07234, herein incorporated by reference. This patent application describes continuous-time behaviour, and supplements the general principle explained supra by various other interconnection patterns both within one single layer and between successive noncontiguous layers. Although this may in various circumstances produce good results, the necessary hardware additions render the system complex.

SUMMARY OF THE INVENTION

Among other things, it is an object of the present invention to allow, at a relatively elementary setup compared to Tomillinson's, to provide an increased learning speed, improved learning facilities, and less susceptibility against instabilities and other undesired behaviour for the perceptron. The object is realized in that according to one of its aspects the invention provides a method for adjusting network parameters in a multi-layer perceptron device that has an initial layer of input elements, a final layer of processing output elements, and a sequence of at least one hidden layer of processing elements, wherein each preceding layer produces its output quantities to feed its next successive layer under multiplication by respective parameter values, said method comprising under presentation of pairs of a source vector at the device input and a target vector at the device output of forward propagation steps for generating a result vector and backward propagating steps wherein under control of a difference between result vector and the associated target vector said respective parameter values are updated in a steepest descent method having a normalized learning rate eta, wherein an initial guess for said learning rate is:

$$eta_i = eta_o \times f(M,N,K),$$

wherein $eta_o$ is an overall learning rate for the layer in question, $eta_i$ is a learning rate for updating a particular parameter value, N is the number of inputs to the processing element fed by the parameter value in question, K is the number of outputs from that processing element, and M is the number of inputs to processing elements of the next layer, and wherein the derivatives $\delta f/\delta M$ is positive, while $\delta f/\delta N$ and $\delta f/\delta K$ are negative for the actual value ranges of M,N,K.

It has been found experimentally that the speed with which the system responds is optimized for particular values of the learning rate. Both for higher values and for lower values of the learning rate the necessary number of iteration steps increases.

A particular further aspect of the invention, however with essentially the same object, is realized by a method for adjusting network parameters in a multilevel perceptron device, said method comprising the steps of:

loading an input vector into input elements of said perceptron and propagating any processing result in a forward propagating step until generation of a result vector;

under control of a first difference between said result vector and an associated target vector in accordance to a steepest descent method adjusting said network parameters in a back propagating step;

repeating said forward propagating step with respect to the same input vector after said adjusting and calculating a second difference with respect to said target vector;

comparing an improvement between said differences with a discrimination level and in case of a smaller improvement raising a learning rate of said steepest descent method but under control of a larger improvement lowering said basic parameter. Also in this aspect there appears to be an optimum learning rate.

The invention also relates to a perceptron device provided with means for accurately and fast adjusting its network parameters.

Various further advantages aspects of the invention are recited in dependent claims.

BRIEF DESCRIPTION OF THE FIGURES

The invention hereinafter will be explained in detail with respect to the following Figures.

FIGS. 3a, 3b and 3c show a set of formulae explaining the optimization.

DESCRIPTION OF THE EMBODIMENTS

Exemplary Description of a Three-Layer Perceptron

Figure 1:
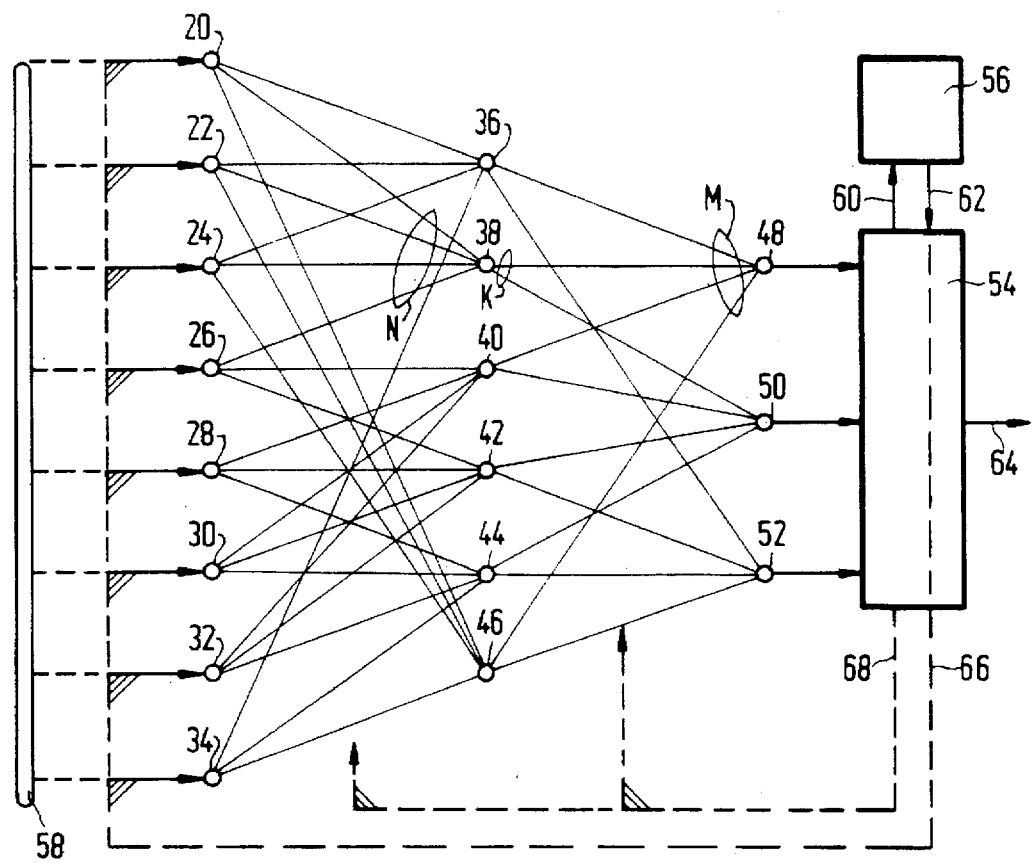
FIG. 1 exemplifies a three-layer perceptron.

FIG. 1 exemplifies a three-layer perceptron. It has a first layer of eight input elements 20–34, a second layer of processing elements 36–46 and a third level of processing elements/output elements 48–52. Each input element has one input connection and three output interconnections. In the second layer each element has four input interconnections fed by associated input elements and two output interconnections. In the output layer each processing element has four input interconnections. There are no interconnections either within a single layer or between elements of layers that are not directly contiguous. Instead of only a single hidden layer, the perceptron may have a succession of hidden layers, still each layer only feeding the next successive layer. The interconnection pattern between contiguous layers need not be uniform. In principle, each element could be fed by all elements of the next preceding layer (if present). It is not necessary that the number of elements per layer decrease monotonically in the direction from the input layer to the output layer. Likewise, it could increase or be constant. The interconnection pattern as shown makes various parameter values for non-existent interconnections essentially equal to zero. Block 54 represents a training processor that has an associated memory 56 (RAM or ROM). Upon addressing via line 60 the memory presents an input vector that is transmitted via line 66 to the input elements 20–34. Each component of this vector may be analog or multi-valued digital. The parameter values are controlled via control line 68; these values may be analog, multi-value digital, positive, zero or negative. Each processing element 36–52 executes an addition operation on all input quantities received. The final result is in this case a three-component vector, which is component by component compared to a target vector associated to the input vector. The differences are used (along line 68) for updating the parameter values. A set of input vectors would be used for training. After training, the perceptron would, for example, recognize each possible character that is fed as an input vector on inputs 58 and is processed in the same way as the training vectors. The result from outputs 48, 50, 52 would then without further processing appear at output 64. In case of character recognition, this could then be a 1-out-of-n code.

Line 66 and inputs 58 are fed to input elements 20–34 in a controllable multiplex organization, details not shown. Applying the parameter values may be effected according to analog multiplication methods known from analog computers, or by digital multiplication for which digital multiplier chips or in-processor embedded multipliers have been widely commercialized. Processor 54 executes various standard computer operations, such as determining differences, summing of squared differences, calculating of update expressions along elementary mathematical expressions. For brevity, no further hardware has been detailed.

Description of an Optimization

Figures 2A, 2B:
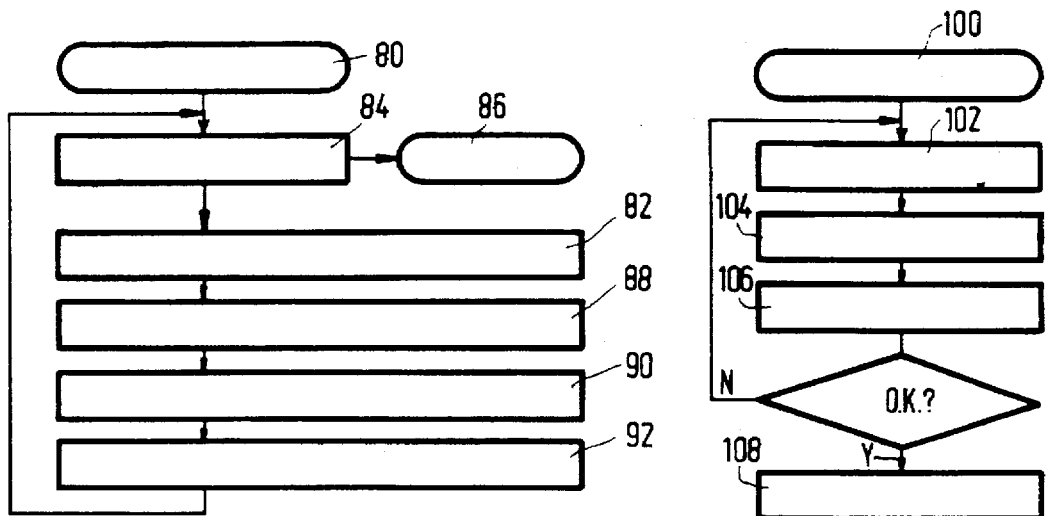
FIGS. 2A and 2B are an elementary flow chart of the updating stratagem.

FIG. 2A is an elementary flow chart of a preferred updating stratagem. Block 80 represents initialization of the system, for example by loading of a set of training input vectors and respective associated target vectors, resetting the address counter of processor 54 and other representative registers. Also a preliminary set of network parameters is entered. In block 82 the first input vector is presented along line 66, after which all perceptron elements process their input data according to their intended function. In an initial setting, all parameter values could be equal to one, all elements (except of the first layer) doing a straight analog add operation. Alternatively, the parameter values may be initialized in an arbitrary way, for example, in that they are set manually to a uniform value that gives convergence. When a new training session is to be started the old manual set is automatically retrieved. The uniform value of course depends on the network configuration. Now, the network as a whole operates synchronously, that is, the difference between result vector and target vector is finalized after all signals have settled. The various elements may operate either asynchronous with respect to each other, or under adequate clock control, so that each element only starts its operation after all input signals thereto have settled. This second mode of operation may be more suitable in case the input values are multi-valued digital. In block 84, between blocks 80 and 82, a stop criterion is applied. This may consider whether all input vectors of the intended set for training had been presented a sufficient number of times. This number may be a preset number with respect to the set overall. Another strategem is to calculate the summed difference for all result vectors or counting the number of differences that would be larger than a discrimination threshold and stopping when this count, after successive decrementing, reaches another lower threshold. If the answer to application of the stop criterion is positive, the system exits to block 86 while signalling a —ready— condition to a user.

If the stop criterion did not become effective, after the forward propagation in block 82, the system goes to block 88. Herein, an update correction is by means of the well-known method of error back propagation according to the steepest descent method applied to all parameter values. Now, the MLP (multilayer perceptron) model is such that an element belonging to a particular layer sums up outputs of a previous layer, and propagates this to the next layer after applying a known Sigmoid function. That is, output $o_j$ of a node j is given by $$o_j = f(net_j) = \frac{1}{1+e^{-net_j}}$$

$$net_j = \sum_i w_{ji} o_i + theta_j$$

where $o_i$ is an output value of the previous layer and $theta_j$ is a bias value of the particular node itself. In error back propagation every parameter value is adjusted to minimize the energy that is defined as the summation of the squared output errors between actual output $o_{pj}$ and the target output $t_{pj}$ which corresponds to input vector (pattern) p. The following expression gives the updating rule for the parameter values (or weights):

$$\Delta w_{ji}(n+1) = eta_o \delta_{pj} + \alpha \Delta w_{ji}(n)$$

Herein, the symbols have following meanings:
i, j, k are the indices of the elements of the successive layers of elements, with i pertaining to the input layers, j pertaining to the hidden layer, and k pertaining to the output layer. For the moment, a single hidden layer is presumed. So, quantity $w_{ji}$ is the multiplicative parameter value in the connection from input element number i to hidden layer element number j. Likewise, $w_{kj}$ relates to interconnection from hidden layer element j to output layer element k. The quantity n is the iterative step number with respect to the application of the input vector in question. For each first application of the input vector in question, this quantity equals zero. The factor $eta_o$ is a learning rate quantity. $\delta_j$ is a generalized difference quantity which for the output layer has been defined as follows:

$$\delta_j = (t_{pj} - o_{pj}) f'(net_j)$$

Here, t is the target value, o is the result value. For the hidden layer, the generalized difference is $$\delta_j = \sum_{k=1}^{K} \delta_k \cdot w_{kj} \cdot f'(net_j)$$

Quantity α is the so-called momentum rate quantity. This reflects the correction effected in the most recent presentation of an input vector. Naturally, in the first updating operation, this second term is equal to zero. The choosing of the value of the learning rate $eta_o$ is discussed hereinafter. After execution of the correction step in block 88 (back propagation), the same input vector is presented again in block 90 (the value of n is not incremented, however) and the maximum difference for each processing element between the input values from the net before and after the (most recent) adjustment of the weight parameters is checked for quantizing the improvement reached by the back propagation in block 88. In block 92 the value of —$eta_o$— is adjusted for optimum speed of the approximation process as will be explained hereinafter. Thereafter, the system reverts to block 84. It was found that the choices of $eta_o$ and α are crucial. A reasonable value of α can be 0.9 although the optimum value can be subject to some indifference. The value of $eta_o$ should be adapted to the number of connections. One of the problems of the method is the convergence of the iteration. Notably, initial values must be chosen correctly, and care must be taken to not become trapped in a local optimum point which differs from the overall optimum point.

FIG. 1 shows how the learning rate is adapted as based on the connectivity number N, M, K which are shown with respect to a processing element of the hidden layer. For the output layer, N is defined as the input connectivity of that layer, while K=M=1. With a standard value $eta_{oo}$ independent of actual connectivity, the learning rate $eta_{oj}$ is adapted according to:

$$eta_{oj} = eta_{oo} \cdot \frac{M}{NK}$$

Therefore, in the example of FIG. 1, for the hidden layer, the factor M/NK=4/8=1/2, for the output layer, the factor M/NK=1N=1/4 (there N is the number of inputs to the output element in question). If not all elements of the output layer have the same input connectivity, a weighting operation on these values is effected. Usually, however, the elements of any particular layer have uniform input connectivity and output connectivity. The background of the above adaptation rule is the following. Every element has the same component such as addition (Σ) and threshold function (f). Normally, the Sigmoid function is used as f because of the differentiability and the normalization between 0 to 1. To simplify, assuming α=0, the difference to be updated becomes $$\Delta W_j = eta_o \delta_j \rho_i \quad (3)$$

After every weight is updated using the above relation, again using the same input vector, the actual difference of summation inputs ($\Delta net_j$) is the following:

$$\Delta net_j = eta_o \delta_j \Sigma O_i^2 \quad (4)$$

Reversely, the desired $eta_o$ can be calculated from this. It is noted that $$\sum_{k=1}^{K} \delta_k w_{kj}$$

means that each $\delta_j$ is multiplied by $w_{kj}$, and is added K times. Moreover, $w_{kj}$ is one of the weights used as a value on the connection to the next element which has M inputs. Thus the above guess ($eta_o$=1) shows a good result. But to be more precise, values $\Delta net_j$, $\delta_j$, $w_{kj}$, $0_i$ should be taken into account. These values are to be changed during calculations. The preferable method is to change $eta_o$ adaptively.

Now, in FIG. 2A the second forward propagation allows to determine whether the maximum absolute difference of input (|Δnet|) is above the given criterion or not. If the difference is smaller than the criterion value (in this case, 0.1 is taken), $eta_o$ is increased. Then finally, as an overall learning rate, the L-th root of the value so found is taken. Herein, L is the total number of processing elements in the network. The new value of $eta_o$ is used in the next forward propagation step. Experimentally the following behaviour for the learning rate was found best to use. The starting value is small. Thereafter it moves to somewhat larger value. Various experiments have shown intermediate stabilization at $eta_o \cong 1$. In the final stages of learning the learning rate got larger. It is suggested that starting with a rather small learning rate is a particularly advantageous aspect of the invention, in as much in general, it is not known which value should be optimum.

The reason for taking the L-th root is for normalizing the growth of the learning rate, where the contribution of each processing element would be a multiplication favtor. Note that $$eta_j = eta_o \cdot f(M, N, K),$$

wherein only the value of $eta_o$ is adjusted. More precisely, the method followed is depicted in FIG. 2B. The legends of the various blocks are:

100: K0=1; 102: iterate in terms of a particular network layer, 104: search absolute maximum value among this particular layer; 106 if this absolute maximum is smaller than a preassigned threshold, then increase K0 by a predetermined amount, if smaller then decrease K0 by a predetermined amount. In various experiments, the amounts were +20% and −20%, but other and also, unsymmetric values are useful as well. After termination of this iteration, 108: take the L-th root of $K_o$, and calculate the new learning rate $eta_{n+1} = K_o \cdot eta_n$. Instead of searching for the absolute maximumn in block 104, also every particular processing element could be interrogated cyclically and its contribution used directly in block 106.

Description of the Algorithm Used

FIGS. 3a–3c show a set of formulae explaining the optimization. First, the following set of parameters is defined:

$n_p$—number of prototype patterns (input vectors);

$n_j$—number of elements in (last) hidden layer; in the example only one hidden layer is present;

$n_k$—number of output elements;

$y_{pk}$—the output value of output element k for input pattern p;

$t_{pk}$—the target value for output element k for input pattern p.

f—the transfer function of a processing element, such as $1/(1+e^{-x})$, x being the input value. Hereabove the Sigmoid function was stated.

$net_{pk}$—the total input to processing element k upon presentation of input vector p.

Basic Error Back Propagation

Now the error function E of a multilayer perceptron is defined as according to FIG. 3a. In the third line the error function is further factorized. Now, this function must be minimized by adjusting the values of $w_{ji}$. Error back propagation is a steepest descent method, where the weights are changed in the direction opposite to the gradient. Given the particular multilayer architecture, the partial derivatives of E with respect to the weights can be calculated recursively, on a layer by layer basis.

For weights $w_{kj}$ connecting elements j of the (last) hidden layer to elements k of the output layer partial differentiation with respect to $w_{kj}$, for a given input pattern p gives (dropping the subscript p for clarity's sake), gives the expressions of FIG. 3b.

Differentiation of the expressions of FIG. 3a, third line, with respect to the weight factors at the input side of the (final) hidden layer that immediately precedes the output layer yields the expressions of FIG. 3c.

Now, it has been found that the convergence of the method according to prior art is rather slow. In remedy thereto, the following strategems are proposed:

a) first for each interconnection step, i.e. for the interconnections between the input layer and the hidden layer and for the interconnections between the hidden layer and the output layer a standard value of eta is chosen: $eta_o$. This value usually is substantially equal to one. The connectivity numbers N, M, K have been defined earlier. Thus, in the situation of FIG. 1, with respect to the single hidden layer: N=4, M=4, K=2. Now, for a particular updating operation, $eta_i = eta_o M/NK = eta_o/2$.

In a particular experiment, the following three network set-ups were used:

a) two input elements would each feed two elements in the hidden layer; the latter would both feed one output element: XOR2 b) two input elements would each feed eight elements in the hidden layer; all of the latter would feed the single output element: XOR8 c) the input elements would each feed 32 elements in the hidden layer; all of the latter would feed the single output element: XOR32.

These networks were used to train for recognition of various pictures. For example, with the latter arrangement the output learning rate was chosen as equal 0.3 variation of the learning rate with respect to the intermediate layer from 0.3 to 55 improved (lowered) the number of iterations by a factor of six.

In another experiment a picture of 10×10 pixels was used as object, with the intermediate layer also consisting of 10×10 processing elements. For a learning rate of the output layer of 0.1, the learning rate of the intermediate layer was varied from 1 to 1000. This improved the number of iterations by a factor of 10–20. The normalization by means of the quantity L allowed for using the high values for the learning rate $eta_o$.

A second speed-up is effected in block 92 of FIG. 2. Herein, the quantity $|\Delta net_{max}|$, with respect to any of the input vectors presented during one round along all input vectors is compared with a preset discrimination level. If this quantity is lower, this means that the risk of instability in the convergence is low and the convergence speed can be increased: $eta_o$ is increased, for example by +20%. If the quantity however is higher, the convergence speed may better be decreased, for example by decreasing $eta_o$ by −20%. Of course, other fractional changes could apply as well, such as ±10%, ±30% or other within a reasonable interval. The positive percentage need not be equal to the negative percentage. In a preferred mode, the discrimination level is at 0.1. However, other values could be just as advantageous, such as 0.08; 0.15 and others. The improved speed was found experimentally by trial and error method.

We claim:

1. A multilayer perceptron device, comprising:

input means for receiving an input vector;

a plurality of processing layers of processing elements including at least one hidden layer of processing elements;

forward propagation comparison means for comparing a processed input vector to an associated target vector and generating a feedback control signal for updating a respective network parameter using back propagation under control of a learning rate, wherein said learning rate is $eta_i = eta_o \times M/KN$, wherein $eta_o$ is an overall learning rate for a layer in question, wherein $eta_i$ is a learning rate for updating the respective network parameter, wherein N is the number of inputs to the processing element fed by the updatable parameter value in question, K is the number of outputs from that processing element, and M is the number of inputs to the processing elements of the next layer.

2. A device as claimed in claim 1, wherein for an output layer M=K=1.

3. A method of training a multilayer perceptron device by tuning a plurality of network parameters that specify strengths of interconnections of said processing elements, the device includes an input for inputting a source vector;

a layer of input processing elements connected to the input;

an output for outputting a result vector;

a layer of output processing elements connected to the output;

a sequence of at least one hidden layer of processing elements between the layer of input processing elements and the layer of output processing elements;

wherein a processing element of each said layers that precedes a next successive layer furnishes output quantities at outputs of the elements to an input of the next successive layer under multiplication by a respective one of said plurality of network parameters; the method comprising the steps of:

storing the source vector at the input;

generating at the output the result vector obtained upon processing of the source vector by the device;

determining a difference between the result vector obtained and a desired vector;

under control of a difference, updating said plurality of network parameter values with a normalized learning rate eta, where an initial guess for said learning rate is:

$$eta_i = eta_o \times f(M,N,K),$$

wherein:

$eta_o$ is an overall learning rate for a layer in question;

$eta_i$ is a learning rate for updating a particular one of said plurality of network parameter values;

N is a number of inputs to a specific one among the processing elements that is fed by a network parameter value in question;

K is a number of outputs from a specific one of the processing elements;

M is a number of inputs to the elements of a next successive layer; and wherein;

f(M,N,K) indicates a functional relationship between M, N and K of a kind that a value of f increases with increasing M, decreases with increasing N and decreases with increasing K for actual ranges of M, N, and K.

4. A method as claimed in claim 3, wherein for the layer of output elements $$eta_i = eta_o \times f(M),$$

N,K having a standard value of 1, and δf/δM being positive.

5. A method as claimed in claim 3, wherein for any particular layer the function f(M,N,K) has a uniform value.

6. A method as claimed in claim 3, wherein f(M,N,K) is substantially proportional to M.

7. A method as claimed in claim 3, wherein f(M,N,K) is substantially inversely proportional to N.

8. A method as claimed in claim 3, wherein f(M,N,K) is substantially inversely proportional to K.

9. A method as claimed in claim 3, wherein for the multilayer perception device $eta_o$ has a uniform value.

10. A multilayer perceptron device, comprising:

input means for receiving an input vector;

a plurality of processing layers of processing elements including at least one hidden layer of processing elements;

forward propagation comparison means for comparing a processed input vector to an associated target vector and generating a feedback control signal for updating a respective network parameter using back propagation under control of a learning rate, wherein said learning rate is $eta_i = eta_o \times f(M,N,K)$, wherein $eta_o$ is an overall learning rate for a layer in question, wherein $eta_i$ is a learning rate for updating the respective network parameter, wherein N is the number of inputs to the processing element fed by the updatable parameter value in question, K is the number of outputs from that processing element, and M is the number of inputs to the processing elements of the next layer, and wherein f indicates a functional relationship between M, N and K of a kind that a value of f increases with increasing M, decreases with increasing N and decreases with increasing K for actual ranges of M, N and K.

* * * * *